(12) United States Patent
Mak et al.

(10) Patent No.: US 8,757,287 B2
(45) Date of Patent: Jun. 24, 2014

(54) ELECTRIC-MOTOR KITCHEN APPLIANCE COMPRISING AN ELECTRIC OR ELECTRONIC CONTROL

(75) Inventors: Marjan Mak, Gomilsko (SI); Darko Ogrizek, Velenje (SI); Aleksander Sedovsek, Mozirje (SI); Uros Semeja, Smartno ob Paki (SI)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 902 days.

(21) Appl. No.: 11/990,532

(22) PCT Filed: Jul. 14, 2006

(86) PCT No.: PCT/EP2006/064269
§ 371 (c)(1),
(2), (4) Date: Mar. 2, 2009

(87) PCT Pub. No.: WO2007/020143
PCT Pub. Date: Feb. 22, 2007

(65) Prior Publication Data
US 2009/0213685 A1    Aug. 27, 2009

(30) Foreign Application Priority Data
Aug. 17, 2005    (DE) .......................... 10 2005 038 919

(51) Int. Cl.
| | |
|---|---|
| A47J 43/07 | (2006.01) |
| A47J 42/56 | (2006.01) |
| A47J 42/38 | (2006.01) |
| A47J 43/08 | (2006.01) |
| B23D 51/10 | (2006.01) |
| B26B 27/00 | (2006.01) |
| A47J 42/44 | (2006.01) |

(52) U.S. Cl.
CPC ................ *A47J 43/075* (2013.01); *A47J 42/56* (2013.01); *A47J 42/44* (2013.01); *A47J 42/38* (2013.01); *A47J 43/08* (2013.01); *B23D 51/10* (2013.01); *B26B 27/00* (2013.01)
USPC ........... 173/170; 219/235; 219/227; 219/221; 173/2; 307/326; 307/140; 368/129

(58) Field of Classification Search
CPC ......... A47J 43/075; A47J 42/56; A47J 42/44; A47J 42/38; A47J 43/08; B23D 51/10; B26B 27/00
USPC .......................................................... 219/235
See application file for complete search history.

(56) References Cited

U.S. PATENT DOCUMENTS

| 2,895,547 A | 7/1959 | Braski | |
|---|---|---|---|
| 3,650,029 A | * 3/1972 | Trelc | ............................ 30/277.4 |

(Continued)

FOREIGN PATENT DOCUMENTS

DE    2011816 A1    9/1971
(Continued)

OTHER PUBLICATIONS
International Search Report PCT/EP2006/064269.
(Continued)

*Primary Examiner* — Nathan Bowers
(74) *Attorney, Agent, or Firm* — James E. Howard; Andre Pallapies

(57) ABSTRACT

An electric-motor kitchen appliance, in particular an electric-motor handheld device, preferably a hand mixer, includes a switch. The invention also relates to a finger-actuated electric control for the switch, and to a method for switching on/off a kitchen appliance. The switch is unlocked when the safety switch is actuated by the finger of a user. The safety switch is electronically switched. The possibility of unintentionally operating the electric-motor of the kitchen appliance is reduced due to the manual operation of the two separate switches. As a result, the safety of the electric-motor kitchen appliance in the household is significantly increased.

25 Claims, 9 Drawing Sheets

(56) References Cited

U.S. PATENT DOCUMENTS

Figure 1:
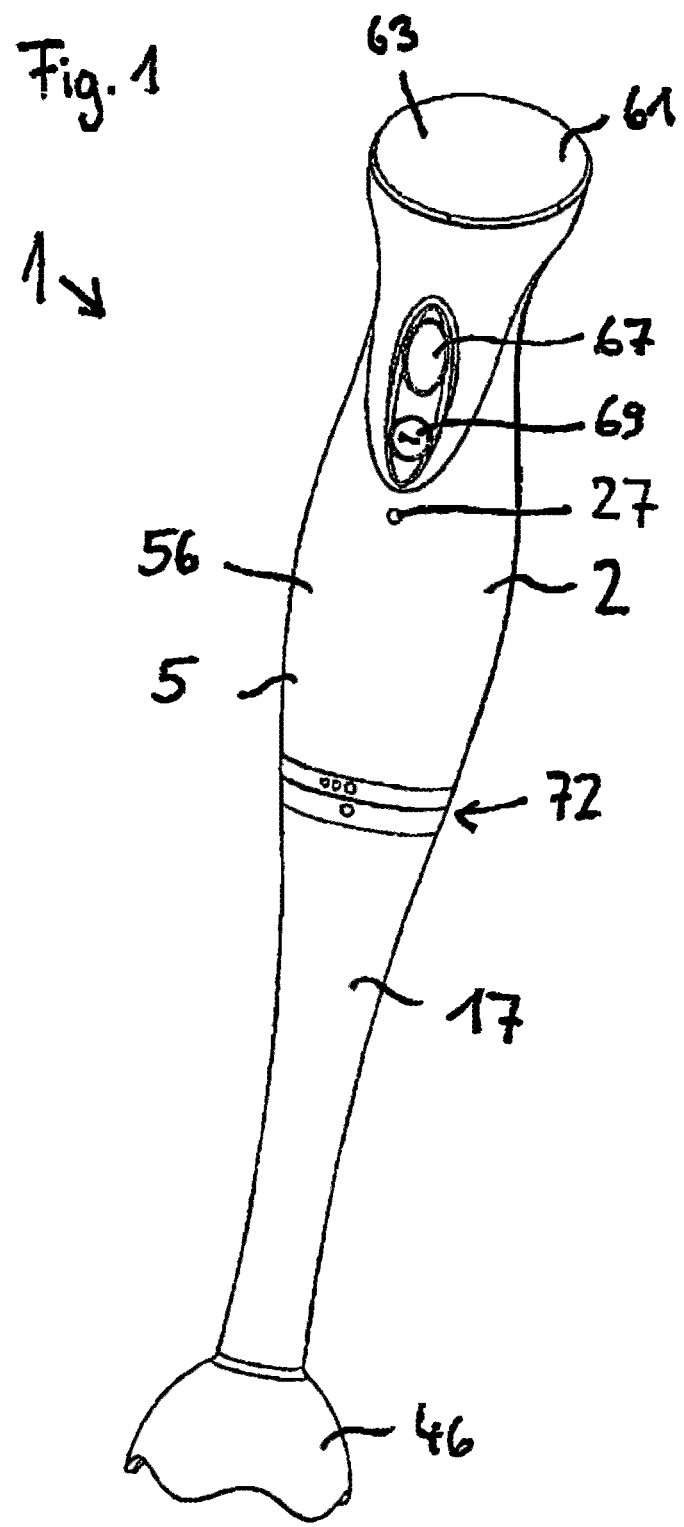

| | | | |
|---|---|---|---|
| 4,965,909 A * | 10/1990 | McCullough et al. | 192/131 R |
| 5,012,582 A * | 5/1991 | Bristol et al. | 30/391 |
| 5,489,807 A | 2/1996 | Sanjuan et al. | |
| 5,583,386 A | 12/1996 | Meixner et al. | |
| 5,921,658 A * | 7/1999 | Kovacik et al. | 362/199 |
| 6,431,425 B1 * | 8/2002 | Moorman et al. | 227/8 |
| 6,568,843 B1 | 5/2003 | Lai | |
| 6,637,925 B1 * | 10/2003 | Beaudet et al. | 366/129 |
| 2003/0178959 A1 * | 9/2003 | Wong et al. | 318/364 |
| 2004/0167675 A1 * | 8/2004 | Bednorz et al. | 700/283 |
| 2006/0081586 A1 * | 4/2006 | Ramsay | 219/235 |

FOREIGN PATENT DOCUMENTS

| | | |
|---|---|---|
| DE | 32 33 516 | 3/1984 |
| DE | 4207772 A1 | 9/1993 |
| EP | 0 417 800 | 3/1991 |
| EP | 0524708 A2 | 1/1993 |
| EP | 0682904 A1 | 11/1995 |
| EP | 0 892 417 | 1/1999 |
| EP | 1 529 472 | 5/2005 |
| FR | 2688676 A3 | 9/1993 |
| GB | 1 222 175 | 2/1971 |
| JP | 48008466 Y1 | 3/1973 |
| JP | 10162677 A | 6/1998 |
| WO | 02102219 A1 | 12/2002 |
| DE | 28 02 155 | 7/1979 |

OTHER PUBLICATIONS

Belling, Ceramic Built-in Hobs, Installation and User Instructions.

Report of Examination DE 10 2005 038 919.8 dated Jul. 26, 2013.

* cited by examiner

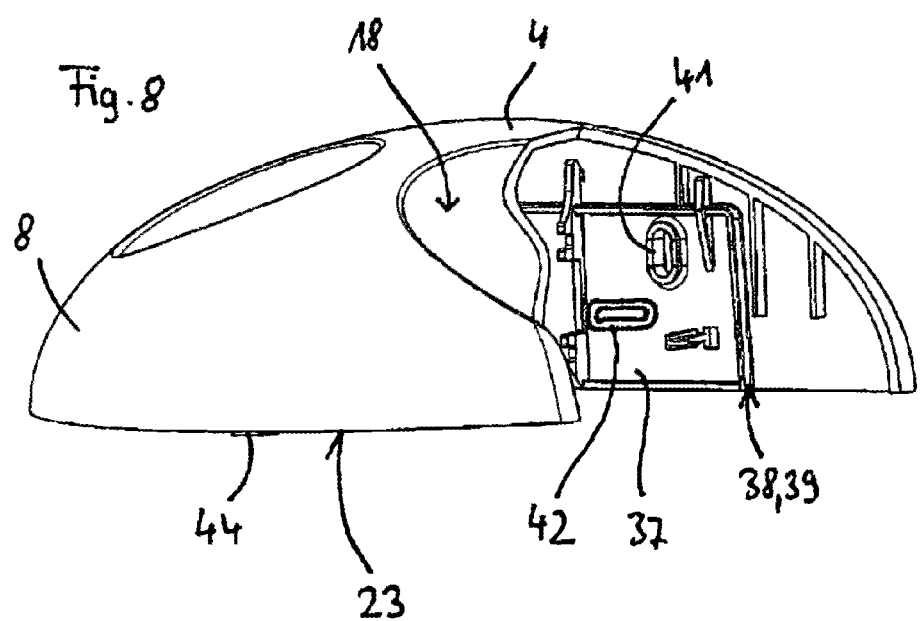

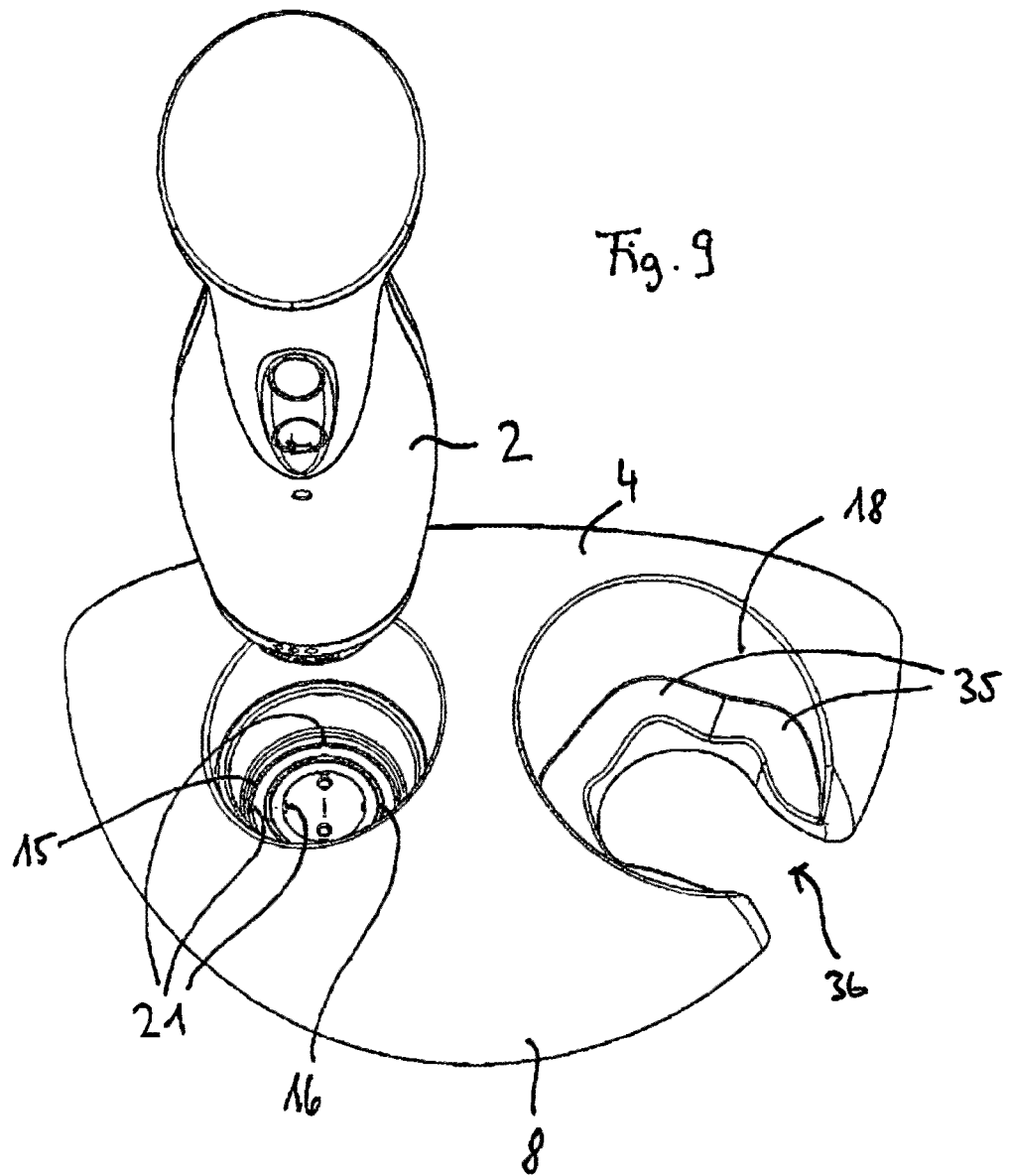

ELECTRIC-MOTOR KITCHEN APPLIANCE COMPRISING AN ELECTRIC OR ELECTRONIC CONTROL

The invention relates to an electric-motor kitchen appliance, in particular an electric-motor handheld appliance, preferably a hand mixer, which comprises a switch, and to a method for switching a kitchen appliance on/off.

DE 42 20 233 discloses a domestic appliance for processing food which contains an electric motor and an electric accumulator battery, in which the accumulator battery is charged by placing the domestic appliance in a charger.

A disadvantage with known electric-motor kitchen appliances is that a certain risk exists that the kitchen appliance may be switched on by accidental and unintended pressing of a switch. This is a problem in particular with hand mixers which have unguarded rotating blades or a rotating pureeing attachment on their tool head. These sharp blades cannot be guarded by a hood because of their function. As a result of unintended actuation of the switch the cutting blades can cause injury to a user of the handheld mixer.

It is therefore the object of the present invention to provide an electric-motor kitchen appliance which causes less potential for injury as well as to provide a method for switching a kitchen appliance on/off more safely.

This object is achieved in accordance with invention by the electric-motor kitchen appliance as well as by the method for switching a kitchen appliance on/off as stated in the independent claims. Further advantageous configurations which can be used individually in each case or combined with each other in whatever configuration required are the subject matter of the various dependent claims.

The electric-motor kitchen appliance, in particular an electric-motor handheld appliance, preferably a hand mixer comprising a switch, incorporates a finger-actuated electric control for the switch.

With the electric control the switch is blocked and its actuation is ineffective unless the control is released. To operate the kitchen appliance the user must first release the control and then switch the kitchen appliance on. Finger-actuatable means that the control is suitable and intended for actuation by a finger of the user. For this purpose in particular a switch is provided which can be actuated by a finger. In contrast to thermal kitchen appliances such as fully or semi-automatic espresso/coffee machines, toasters, egg boilers, kettles, deep fryers, waffle makers, contact, table or patio grills, irons and steam pressers, electric-motor kitchen appliances such as food processors, table mixers, universal choppers and blenders, hand mixers, hand blenders and universal cutters use an electric motor to achieve a particular desired effect. Such a kitchen appliance in particular incorporates rotating blades and/or cutters.

The control device exhibits in particular a safety switch which is separate from the on/off switch. The safety switch is manually actuatable. It is suitable and intended for operation by a user of the kitchen appliance. The safety switch is in particular located in a recess so that unintended pressing of the safety switch, for example by pressing with the palm of the hand, is made more difficult. This for example prevents a child from switching on the hand mixer by pressing the safety switch and the on/off switch with simply the palm of his or her hand.

The safety switch is located at a distance of less than 4 cm, in particular less than 3 cm, preferably less than 2 cm from the on/off switch, which means that in particular it can be operated by the user with the same hand as for the on/off switch.

An actuation-effective distance between the on/off switch and the safety switch amounts to at least 0.5 cm, in particular at least 0.8 cm, preferably at least 1.2 cm and amounts in particular to less than 4 cm, in particular less than 3 cm, preferably less than 2.5 cm. Actuation-effective distance means that the respective press points of the switches must exhibit this distance for effective actuation. The minimum distance ensures that the safety switch and the on/off switch cannot be operated at the same time with one finger, which reduces the probability of the control device being operated by mistake. The safety switch is designed in particular as a manual switch.

Advantageously, the control exhibits a time-integration circuit by which the on/off switch is not unlocked until after prolonged uninterrupted actuation of the safety switch. A time-integration circuit further increases the safety of the electric control. In particular, this improves safety in households where there are children.

The integration time of the time-integration circuit can have a duration of at least 0.1 sec., in particular at least 0.2 sec., preferably at least 0.3 sec. Only when the safety switch is pressed for a duration of for example 0.2 sec. does the on/off switch become activatable.

In a special configuration it is provided that the control incorporates a time-integration circuit with which the on/off switch is not unlocked until after prolonged uninterrupted actuation of the safety switch and is unlocked for a preset time window. In other words: the on/off switch is not unlocked until after a certain time has passed following actuation of the safety switch and then it is locked again. This means that the on/off switch can only be operated within a preset time window following actuation of the safety switch. This too further increases the safety of the kitchen appliance. The length of the time window can be in a range from 0.3 sec. to 2 sec., in particular in a range from 0.5 to 1 sec.

In an advantageous configuration a further electric actuating element, in particular an electric step switch, is provided to set an electric power stage of the kitchen appliance, in which the actuating element is provided on, in particular together with and in connection with the on/off switch. By means of the actuating element the power stage of the kitchen appliance can be freely, in particular continuously, selected, preferably in a range from 100 W to 900 W, in particular in a range of 150 W and 400 W.

Advantageously, the safety switch only stays switched on for the time during which it is actuated, in particular pressed, and otherwise switches off. This ensures that the kitchen appliance can only be operated if at least for a length of time both the safety switch and the on/off switch are actuated, in particular pressed, jointly and at the same time.

The method in accordance with the invention for switching on/off a kitchen appliance, in particular an electric-motor handheld appliance, preferably a hand mixer, which exhibits an on/off switch and a separate safety switch, whereby the on/off switch is unlocked when the safety switch is actuated, provides that the safety switch is finger-actuated and switches electrically. Finger-actuated means that the safety switch is actuated by a finger of the user. To this end, the safety switch is provided in particular as a momentary-contact switch or tumbler switch or maintained-contact rotary control switch for one finger.

Advantageously, the on/off switch is unlocked when the on/off switch is actuated only after actuation of the safety switch, in particular with a time delay of at least 0.1 sec., in particular at least only 0.2 sec., preferably at least 0.3 sec. In a special configuration the unlocking is only effective for the length of a preset time window in a range from 0.3 sec. to 2 sec., in particular in a range from 0.5 sec. to 1 sec. Advantageously, the on/off switch can only be unlocked while the safety switch is being held, and in a special configuration, only after having been locked, the on/off switch also remains in a switched-on position when the safety switch is no longer held.

Further advantageous details and special configurations are explained more closely with reference to the following drawing which is intended not to restrict the existing invention but merely to illustrate it by way of example.

Figure 2:
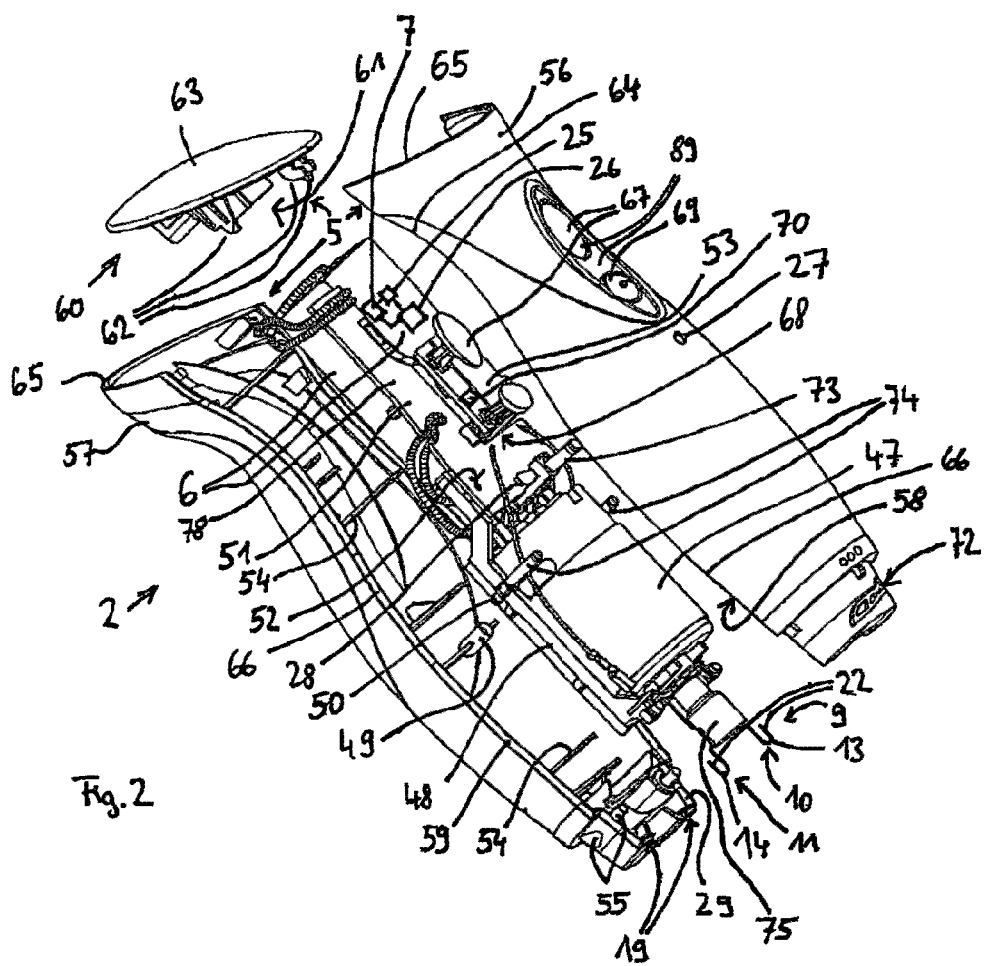
Figure 3:
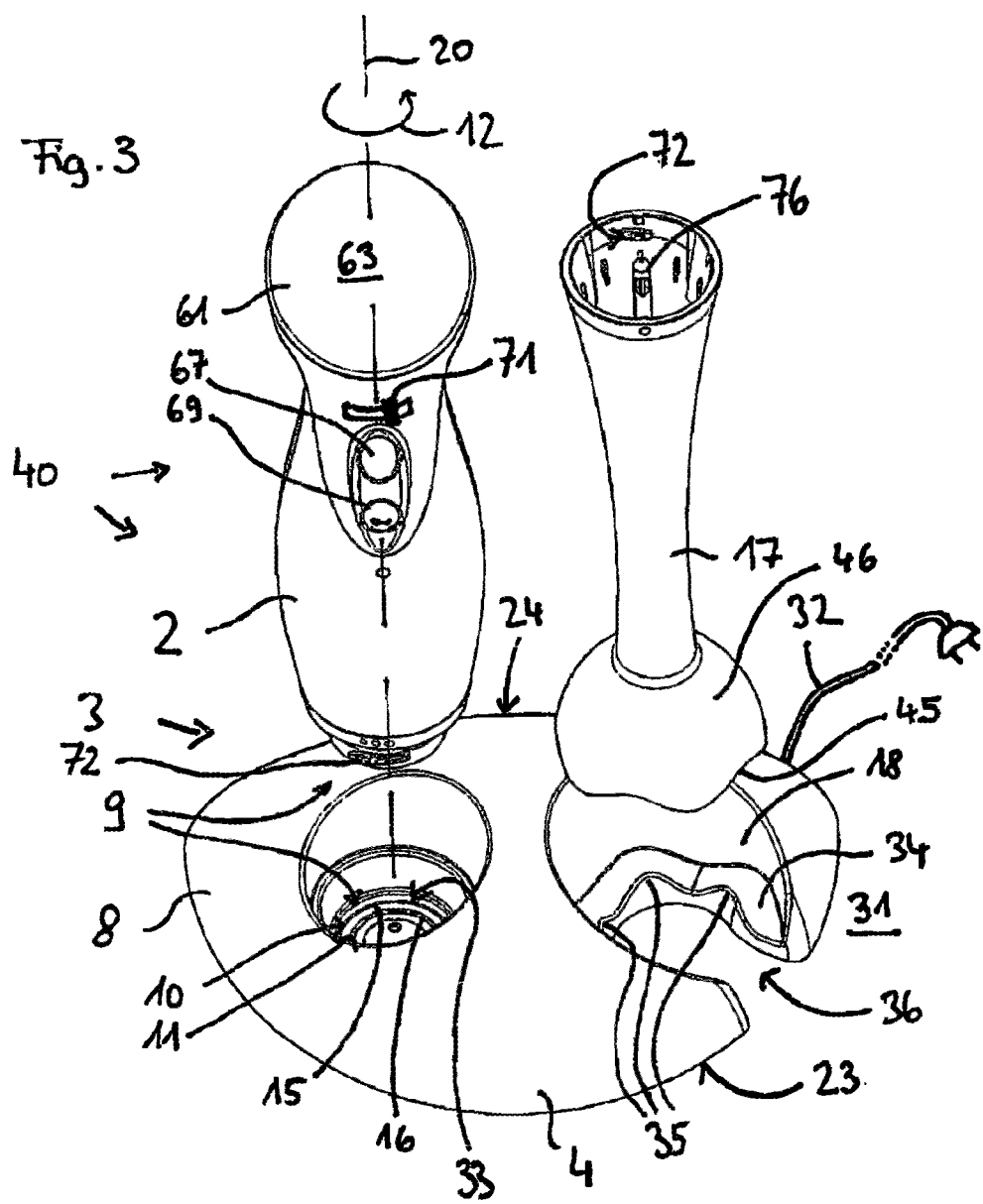
Figure 4:
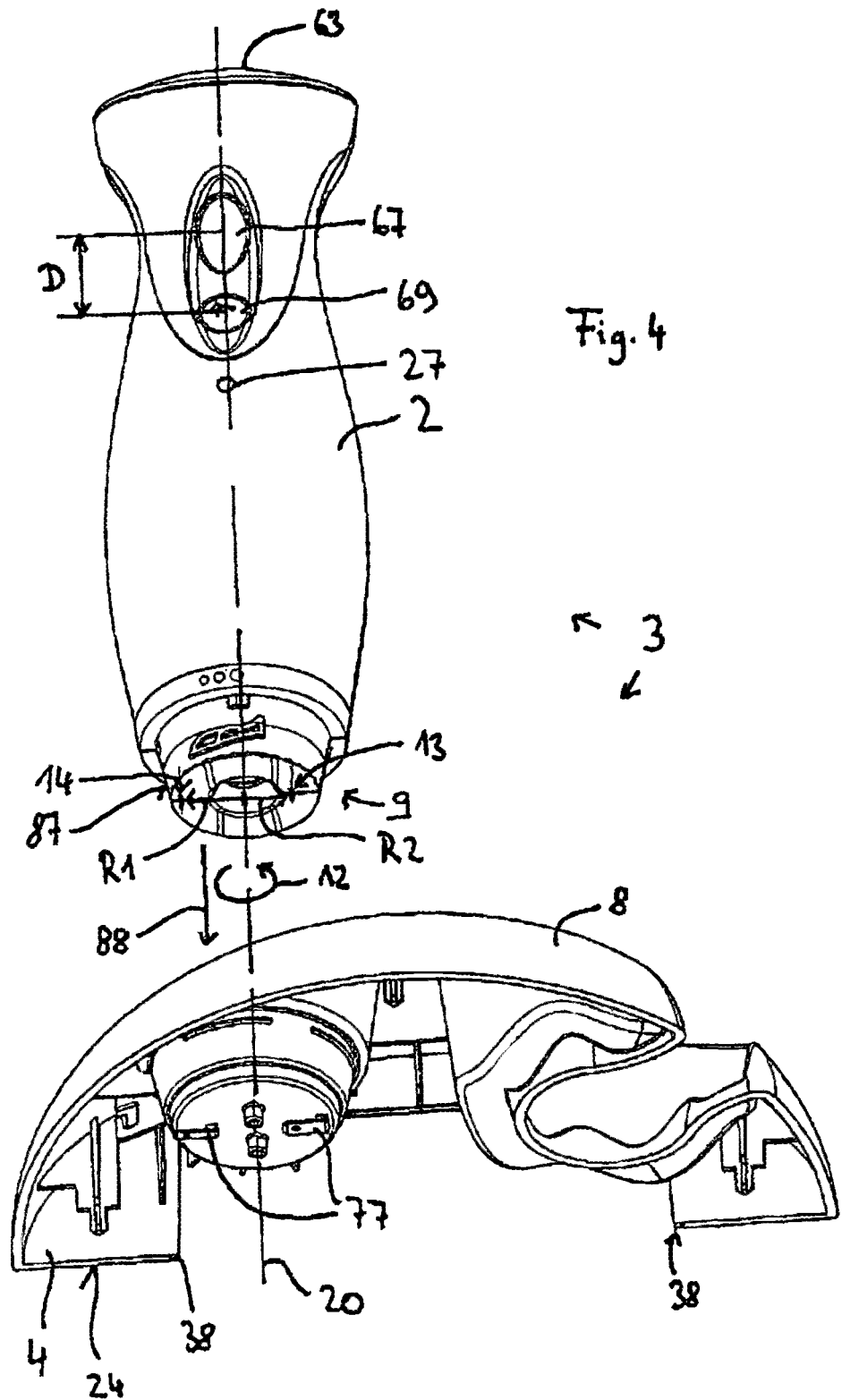
Figure 5:
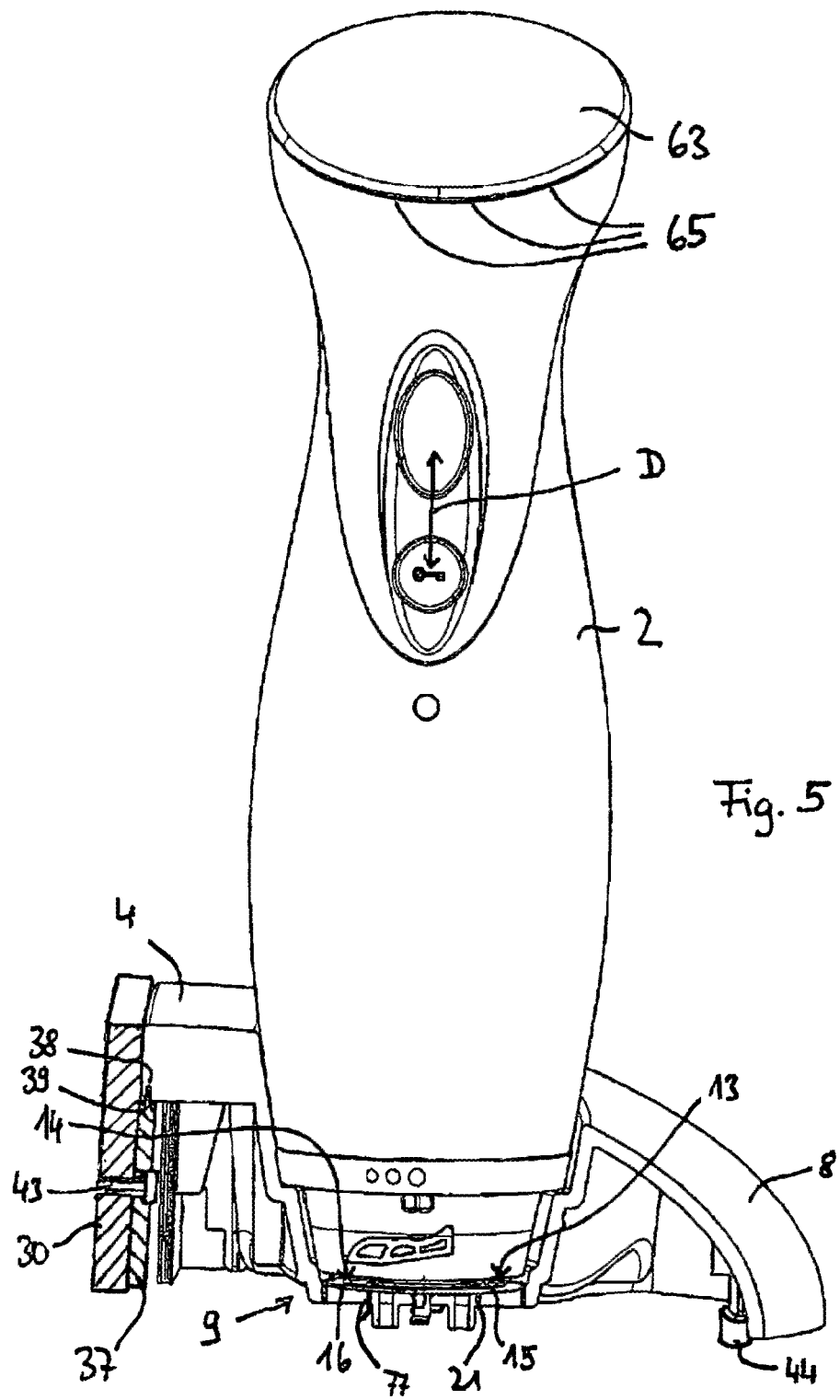
Figure 6:
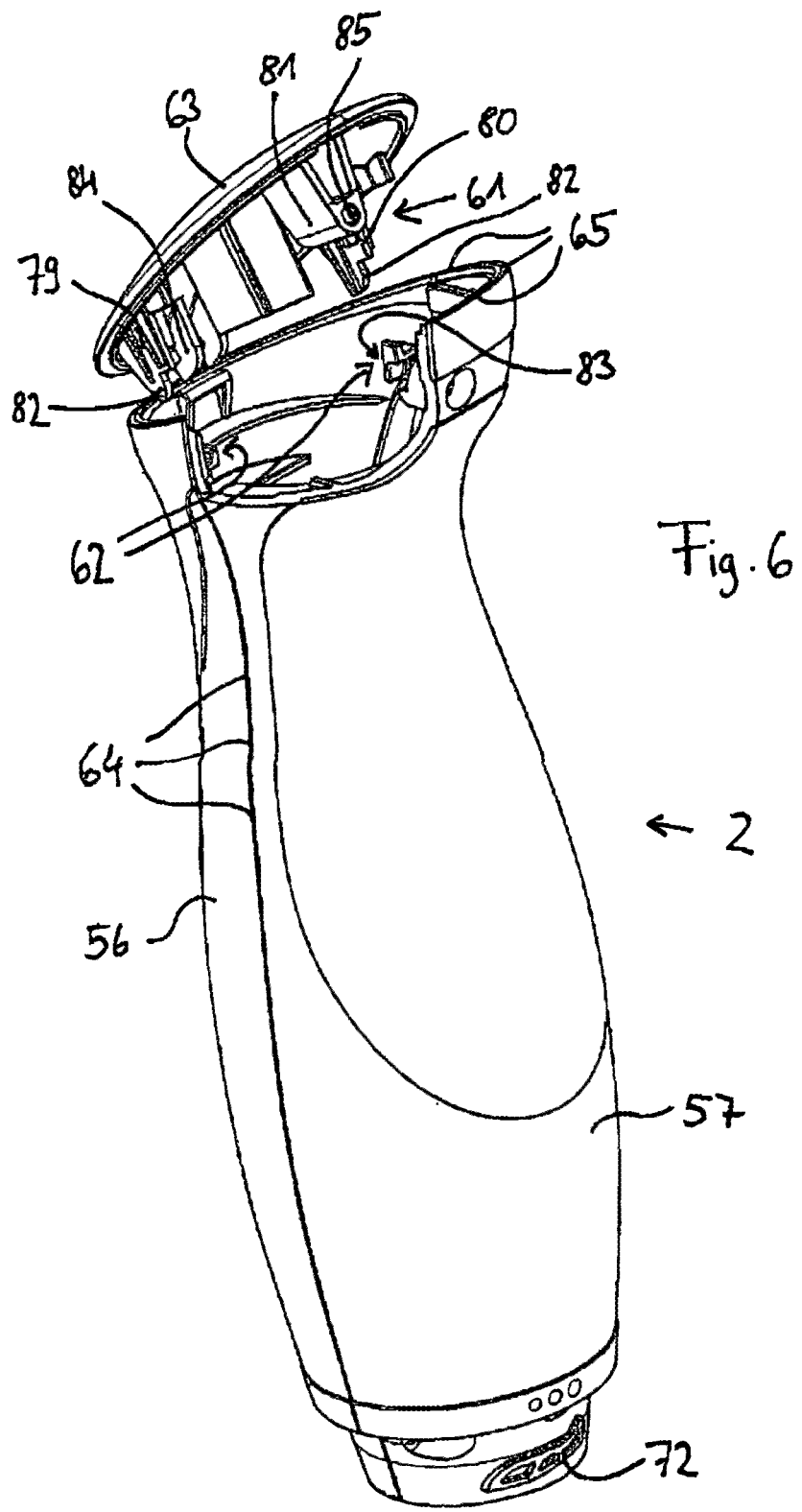
Figure 7:
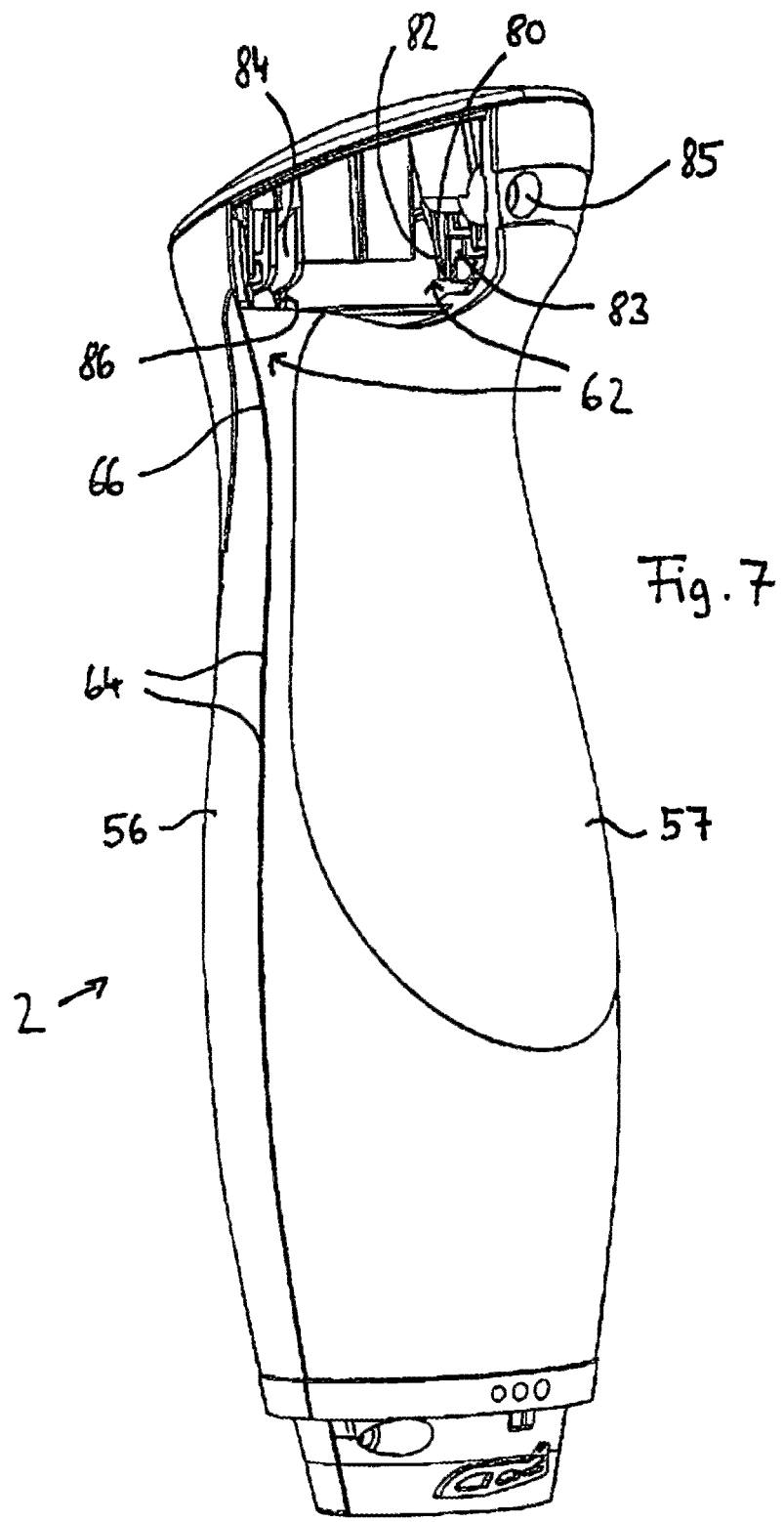

The following are illustrated schematically:

FIG. 1 a kitchen appliance in accordance with the invention which is configured as a hand mixer in a top perspective view;

FIG. 2 the hand mixer as in FIG. 1 in an exploded perspective view;

FIG. 3 the kitchen appliance in accordance with the invention as in FIG. 1 with a charger in an angled perspective view from above;

FIG. 4 the kitchen appliance and the charger as in FIG. 3 in a further angled perspective view from below;

FIG. 5 the kitchen appliance in accordance with the invention as in FIG. 1 in a side view with the kitchen appliance placed in a charger which is shown in cross-section;

FIG. 6 the hand mixer in accordance with the invention as in FIG. 2 with an opened clamping cover and a partially cut-out edge in an angled perspective view from the side;

FIG. 7 the hand mixer as in FIG. 6 with the cover closed;

FIG. 8 a charger in accordance with the invention as in FIG. 4 in a side view with a partially cut-open charger housing;

FIG. 9 the kitchen appliance and the charger as in FIG. 3 in an angled perspective view from above.

FIG. 1 shows a kitchen appliance 1 in accordance with the invention, designed as hand mixer 2. On the hand mixer 2 a tool 17 configured as a cutting or pureeing attachment is fitted by means of a bayonet connection 72. The tool 17 exhibits a tool head 46 which has corresponding blades and mixing elements (not shown). The hand mixer 2 exhibits a housing 5 with a first housing shell 56, a clamping cover 63 configured as a clamping element 61 and a second housing shell 57 (see FIG. 2). A charge status display 27 indicates whether the hand mixer 2 is ready for operation, in particular whether it has enough charge. The hand mixer 2 is set in motion using an on/off switch 67. The on/off switch 67 is, however, only effective if it has been unlocked by a safety switch 69. The safety switch 69 which is separate from the on/off switch 67 effects an electric control which only unlocks or releases the on/off switch 67 with a time delay after actuation of the safety switch 69. This ensures that the hand mixer 2 is not set in motion unintentionally, which increases safety in particular in a household where there are children.

FIG. 2 shows a hand mixer 2 in accordance with the invention in an exploded perspective view with a housing 5 which is formed by a first housing shell 56, a second housing shell 57 and a clamping cover 63. The housing 5 accommodates a motor 47, an electronic control unit 51 on a board 78 and an accumulator battery 6. The motor 47, the board 78 with the electronic control unit 51 and the accumulator battery 6 are mounted on a carrier 48. The motor 47 and the accumulator battery 6 are fastened onto the carrier 48, which can be inserted in the housing 5. The carrier 48 is connected with the housing 5 without any adhesive or screws. For this purpose the carrier 48 exhibits engagement elements 49, 74, with which it is fixed to corresponding counter elements 50 on the housing 5, for example by being clipped on. The electronic control unit 51 is clipped on by means of first engagement elements 52. An electric switch 67, 69, an on/off switch 67 and a safety switch 69 are also clipped onto the carrier 48 with the aid of second engagement elements 53. The motor 47 and the accumulator battery 6 are clipped onto the carrier 48. Because the individual components can be pre-assembled and can be connected without the use of screws the manufacture of the hand mixer 2 is considerably simplified and reduced in cost. The two housing shells 56, 57 are connected with each other gaplessly along a housing groove 58 or housing tongue 59 along a first connection line 64 which is formed by the edges 66 of the two housing shells 56, 57. The clamping cover 63 is connected with the two housing shells 56, 57 essentially gaplessly along a second connection line 65. The clamping cover 63 serves as a clamping element 61 which by means of a fastener 60 connects the two housing shells 56, 57 with each other. The clamping element 61 engages with the first housing shell 56 at at least two separate fastening points 62 and presses the first housing shell 56 against the second housing shell 57 at the two fastening points 62. The carrier 48 with the motor 47 and the accumulator battery 6 is supported in the housing shells 56, 57 by means of supports 54 and is therefore fixed without the use of adhesive or screws. A safety device 7 is provided on the accumulator battery 6 which protects the accumulator battery 6 from excessive pressure, formation of metallic lithium on the electrodes of the accumulator battery 6 or formation of gas in the accumulator battery 6. In addition, a control device 26 with a temperature sensor 25 ensures that the accumulator battery 6 is protected from excessive fluctuations in temperature which could result in a (temporary or lasting) negative effect on the performance of the accumulator battery 6. The control device 26 can regulate the temperature of the accumulator battery 6 to a temperature range. Using the safety device 7 a maximum charging current or a maximum discharging current is preset, which increases the safety of the lithium-ion accumulator battery 6. The board 78 is fastened on the carrier 48 using first engagement elements 52. An on/off switch 67 and a safety switch 69 are clipped onto the board 78 by means of second engagement elements 53. In the area of the switches 67, 69 the first housing shell 56 exhibits a rubber membrane 89 sprayed on by means of a 2-component method which protects the switches 67, 69 under it. The on/off switch 67 is unlocked by the safety switch 69 being actuated a short moment before the on/off switch 67. For this purpose a time-integration circuit 70 is provided which permits unlocking only after a delay of 0.3 sec. The safety switch 69 and the time-integration circuit 70 form an electronic control 68 for the hand mixer 2. The charge status of the accumulator battery 6 is indicated by means of a charge status display 27. The charge status display 27 exhibits an LED display 28 on the board 78 whose light is conducted outwards by an optical fiber 73. A tool 17 (see FIG. 3) is connected to the hand mixer 2 by means of a bayonet fitting 72 so that a rotor 75 of the motor 47 is rotationally connected with a shaft 76 (see FIG. 3) of the tool 17. The two housing shells 56, 57 are connected with each other on the tool-side end of the hand mixer 2 by means of screw fasteners 55. To charge the accumulator battery 6, two sliding contacts 10, 11 configured as spring elements 22 are provided which in each case exhibit a slider 13, 14. By means of the two sliding contacts 10, 11 an electrical coupling 9 is provided to transfer electrical energy from a charger 8 (see FIG. 3) to the hand mixer 2. The two sliders 13, 14 are led through openings 19 in an enclosure 29 of the second housing shell 47.

FIG. 3 shows the hand mixer 2 in accordance with the invention as in FIG. 2 with a charger 8 and a tool 17 in an angled perspective view from above. The hand mixer 1 powered by an accumulator battery 6 and the charger 8 for hand mixer 2 for charging the accumulator battery 6 form a charging system 3 in which the hand mixer 2 during charging of the accumulator battery 6 can be connected with the charger 8 via an electrical coupling 9. Using the coupling 9 electrical energy is transferred from the charger 8 to the hand mixer 2. The coupling 9 permits the hand mixer 2 to be turned relatively to the charger 8, so that the hand mixer 2 can be inserted easily into the charger 8 without precise alignment of its angle of turn 12 relatively to the charger 8. The coupling 9 exhibits two sliding contacts 10, 11 with two sliders 13, 14 and two sliding rings 15, 16 and permits an angle of turn 12 of more than 360°. This facilitates particularly easy coupling of the hand mixer 2 with the charger 8. The sliding rings 15, 16 form electrical contact surfaces 33 to produce a galvanic contact of the accumulator battery 6 in the hand mixer 2 with the charger 8. The charger 8 is electrically connected with an external mains circuit (not shown). The charger 9 forms a holder 4 for the hand mixer 2 and can be fastened to a wall 30 (see FIG. 5) by means of a fastening surface 24 or can be placed on a surface 31 such as a kitchen worktop for instance using a stand surface 23. The holder 4 exhibits a tool receptacle 18 for the tool 17, for which purpose the tool receptacle 18 has a receptacle base 34 with corrugations which are adapted to the shape of the tool head 46 and its contour 45 in such a way that secure holding of the tool 17 is ensured when the tool 17 is placed in the tool receptacle 18. If the holder 4 is fastened to a wall 30 (see FIG. 5) the tool 17 can also be suspended in the tool receptacle 18 by inserting the tool 17 through a radial gap 36 in the annular tool receptacle 18. The charger 8 exhibits electrical leads 32 which can be connected with an external power supply (not shown). The hand mixer 2 and the tool 17 are fastened by means of a bayonet connection 72, by turning through about 120° around a longitudinal axis 20. A shaft 76 of the tool 17 also couples with the rotor 75 (see FIG. 2) of the motor 47. The power stage of the hand mixer 2 can be adjusted using an actuating element 71. In particular, various speed and power stages such as 100 W, 200 W, and 300 W can be selected. The multifunctional holder 4 for the hand mixer 2 and the hand mixer 2 represent an arrangement 40 which is particularly advantageous for use of the hand mixer 2. In particular it enables the hand mixer 2 to be gripped and used easily without being impeded by an electrical cable. After use the hand mixer 2 can be quickly and easily placed in the charger 8. By means of the holder 4 the hand mixer 2 can be placed on a surface 31 or fastened on a wall 30 such as a kitchen wall or a cupboard wall.

FIG. 4 shows a hand mixer 2 in accordance with the invention with the charger 8 as in FIG. 3 in an angled perspective view. The on/off switch 67 and the safety switch 69 are separated from each other by an actuation-effective distance D. Actuation-effective means here that two fingers have to exhibit this distance D so that the two switches can be effectively actuated. This ensures that the hand mixer 2 cannot be set in motion accidentally or unintentionally with a single finger. The charging system 3 exhibits the first slider 13 and the second slider 14 which are both at a distance from the longitudinal axis 20 corresponding to the radius R1, R2 of a sliding ring 15, 16. The two sliding rings 15, 16 (see FIG. 3) can be electrically contacted by means of contact legs 77. The holder 4 can be fixed to a wall 30 by means of a mounting plate 37 (see FIG. 5). The mounting plate 37 is fastened to the holder 4 by means of a mounting plate groove 38. Thanks to the 360° coupling 9 the hand mixer 2 can be placed easily in the charger 8 without any particular attention having to be paid to the alignment of the hand mixer 2 relative to the charger 8. With the aid of guide surfaces 87 which are angled in relation to a coupling direction 88 along which the kitchen appliance 1 is inserted in and attached to the charger 8, a coupling of the kitchen appliance 1 with the charger 8 is further facilitated. The guide surfaces 88 can be funnel-shaped. With the aid of the guide surfaces 88 the kitchen appliance 1 is guided to the correct position in the charger 8.

FIG. 5 shows the hand mixer 2 in accordance with the invention in a side view, with the kitchen appliance 1 placed in a charger 8 which is shown in cross-section. Here the electrical coupling 9 of the hand mixer 2 with the charger 8 is established by the first sliding contact 10 with the first slider 13 and the first sliding ring 15 as well as by the second sliding contact 11 with the second slider 14 and the second sliding ring 16. The two sliding rings 15, 16 in each case exhibit contact legs 77, which are electrically contacted from below. The two sliding rings 15, 16 also exhibit fastening legs 21 which form a hook on the charger 8 and therefore create a secure fastening for the two sliding rings 15, 16. The holder 4 can stand on a surface 31 (see FIG. 3) with rubber feet 44. Using the mounting plate 17, which is fastened on the holder 4 by means of a mounting plate groove 38 and a mounting plate tongue 39, it can, however, also be screwed onto a wall 30 using a screw 33. The housing 5 of the hand mixer 2 is connected to the two housing shells 56, 57 along a second connection line 65 by means of a clamping cover 63.

FIG. 6 shows the hand mixer 2 in accordance with the invention as in FIG. 1 with an opened clamping cover 63 and a partially cut-open second housing shell 57. The clamping cover 63 forms a clamping element 61 by which the first housing shell 56 is clamped together with the second housing shell 57 in such a way that a largely gapless connection is created between the two housing shells 56, 57 along the first connection line 64. For this purpose the clamping cover 63 engages into a corresponding recess on the first housing shell 56 by means of a fourth connection element 64 and a first connection element 79 and a second connection element 80 with respective connection protrusions 82 engage behind two separate connection points 62 into corresponding separate connection supports 83. A fourth connection element 84 engages into a cover support 46 on the first housing shell 56. If the clamping cover 63 is connected to the second housing shell 57 by means of a third connection element 81 and a screw connection 85, the respective protrusions 82 press the first housing shell 56 against the second housing shell 57 at the two separate connection points 62. This creates a gapless connection of the two housing shells 56, 57 even if production tolerances along the first connection line 64 (e.g. inaccuracies on the housing groove 58 or on the housing tongue 59 of the housing shells 56, 57) make it difficult to close the two housing shells 56, 57.

FIG. 7 shows the hand mixer 2 in accordance with the invention as in FIG. 6 with the clamping cover 63 closed in a side perspective view with a partially cut-open second housing shell 57. It can be seen that the connection protrusion 82 engages behind the connection support 83 and as a result presses together the two edges 66 of the housing shells 56, 57 at the two fastening points 62.

FIG. 8 shows the holder 4 which is configured as the charger 8 and which is partially cut open from the side with the tool receptacle 18. The holder 4 exhibits rubber feet 44 on its stand surface 23. Using the mounting plate 37 the holder can be fastened to a wall 30 (see FIG. 5). This purpose is served by first 41 and second 42 long holes with which a simple screw connection can be made on the wall 30. The long holes 41, 42 enable the mounting plate 37 to be aligned in vertical and horizontal direction and therefore facilitate particularly easy fixing of the holder 4 to the wall 30.

FIG. 9 shows the hand mixer 2 in accordance with the invention with the holder 4 configured as the charger 8 in an angled perspective view. The sliding rings 15, 16 configured on the charger 8 can be recognized which are fastened to the holder 4 by means of fastening legs which exhibit barbs (not shown). The tool receptacle 18 exhibits corrugations 15 which are adapted to the contour 45 of the tool 17 in such a way that the tool 17 stands securely in the tool receptacle 18. With the aid of the radial gap 36 the tool 17 can be suspended in the tool receptacle 18.

Various further aspects connected with the invention are described below. The individual aspects can in each case be applied individually, i.e. independently of each other, or combined with each other in whatever configuration required:

A particularly advantageous electric-motor kitchen appliance 1 which is mains-independent exhibits a lithium-ion accumulator battery 6 or a lithium-polymer accumulator battery. The accumulator battery 6 can exhibit a specific capacity in a range from 50 Ah/kg to 130 Ah/kg, in particular from 60 Ah/kg to 80 Ah/kg. In particular a safety device 7, in particular a protection circuit, is provided for the accumulator battery 6, whereby advantageously the safety device 7 prevents excessive pressure and for this purpose exhibits in particular an opening for relieving excessive pressure. The safety device 7 can also exhibit a temperature sensor 20 for the accumulator battery 6. The safety device can control the temperature of the accumulator battery 6. Advantageously, an electronic control device 26 is provided which monitors the charging and discharging of the accumulator battery 6 and if necessary limits the charging and discharging current. The maximum output from the accumulator battery 6 lies in particular in a range from 200 W to 800 W, in particular in a range from 250 W to 400 W. The kitchen appliance 1 is designed in particular as a hand blender, preferably as a hand mixer 2. In a special configuration a charge status display 27 for the accumulator battery 6, in particular an LED display 28, is provided.

A preferred charging system 3 comprises a kitchen appliance 1 powered by an accumulator battery 6, in particular a hand mixer 2, and a charger 8 for the kitchen appliance 1 to charge the accumulator battery 6, in which, for charging the accumulator battery 6, the kitchen appliance 1 can be connected to the charger 8 by means of a coupling 9 in order to transfer electrical energy from the charger 8 to the kitchen appliance 1, whereby the coupling 9 permits the kitchen appliance 1 to be turned relatively to the charger 8. The coupling 9 preferably permits a turn, in particular around the vertical, through an angle of turn 12 of more than 90°, in particular more than 180°, preferably through more than 360°. In a special configuration the coupling 9 exhibits at least two sliding contacts 10, 11 with two sliders 13, 14 and two sliding rings 15, 16, whereby the two sliding rings 15, 16 can be arranged concentrically and exhibit various radii R1, R2 or the two sliding rings 15, 16 can be offset coaxially. The two sliding rings 15, 16 are advantageously fastened to the charger 8. To avoid electrolytic corrosion as a result of liquid splashing on the charger the sliding rings 15, 16 can be fastened onto the kitchen appliance 1. Advantageously, the kitchen appliance 1 exhibits a tool receptacle 18 for a tool 17, and the sliding contacts 10, 11 for the coupling 9 of the kitchen appliance 1 are arranged with the charger 8 in such a way on or in the tool receptacle 18 that the sliding contacts 10, 11 on the kitchen appliance 1 are covered by the tool 17 on the kitchen appliance 1 during use of the kitchen appliance 1. The sliding rings 15, 16 are in particular stamped from sheet metal. A sliding ring 15, 16 advantageously exhibits at least one contact leg 77 angled to a plane formed by the sliding ring 15, 16, which leg protrudes through an opening 19 in an enclosure 29 on the kitchen appliance 1 or on the charger 8. A sliding ring 15, 16 can exhibit two, preferably at least four, fastening legs 21, in particular angled to a plane formed by the sliding ring 15, 16, with which the sliding ring 15, 16 is fastened, in particular clipped or hooked in position. The charger 8 is advantageously produced by injection molding. The sliders 13, 14 are advantageously configured as spring elements 22 and in the coupled status of the kitchen appliance 1 and the charger 8 are resiliently supported on the sliding rings 15, 16. Advantageously, guide surfaces 87 which are angled and/or curved in relation to a coupling direction 88 are provided on the kitchen appliance 1 and/or charger 8 to facilitate connection of the kitchen appliance to the charger. The charger 8 used is suitable and intended for use with the charger system.

A particularly advantageous multifunctional holder 4 for a hand mixer 2 comprises a stand surface 23 with which the holder 4 can be placed on a horizontally plane surface 31 and a fastening surface 24 with which the holder 4 can be fastened to a wall 30. Advantageously it provides a first tool receptacle 18 to hold a tool 17, in particular a blender and/or pureeing attachment. The holder 4 exhibits in particular electrical leads 32 and advantageously forms a charger 8 for a hand mixer 2 powered by an accumulator battery 6. The holder 4 can exhibit electrical contact surfaces 33, in particular sliding rings 15, 16 and/or sliders 13, 14 for electrical contacting of the hand mixer 2 powered by the accumulator battery 6. Advantageously, the tool receptacle 18 is designed in such a way that tool 17 can be placed in the tool receptacle 18 so that in particular the tool 17 is located largely above the tool receptacle 18. Alternatively or additionally the tool receptacle 18 can be designed in such a way that the tool 17 can be suspended in the tool receptacle 18 so that in particular the tool 17 is located largely above the tool receptacle 18. In a special configuration the tool receptacle 18 exhibits a receptacle base 34 which is corrugated and in particular exhibits at least four, advantageously at least five, corrugations 35. The tool receptacle 18 can be annular, with the annular tool receptacle 18 advantageously exhibiting a largely radial gap 36 with which the tool 17 can be pushed into the annular tool receptacle 18. The fastening surface 24 is advantageously configured as a mounting plate 37 which can be fastened in a detachable fashion on the holder 4. The mounting plate 37 can be configured in such a way that it can be clipped onto the holder 4. The mounting plate 37 can in particular be pushed on and fastened to the holder 4 by means of a mounting plate groove 38 and mounting plate tongue 39. It is advantageous if the mounting plate 37 exhibits at least a first long hole 41 for fastening the unit to a wall 3 with a screw 43. It is also advantageous if a second long hole 42 which is in particular arranged vertically to the first long hole 41 is provided for fastening the holder 4 to a wall 3 with a screw 43. A further configuration provides rubber feet 44 on the stand surface 23.

A particularly advantageous arrangement comprises the advantageous holder and a hand mixer 2 which is held by the holder 4. The arrangement can also exhibit a tool 17 for the hand mixer 2, in particular a blender and/or pureeing attachment, with the tool 17 being held by the holder 4 by means of a tool receptacle 18. It is advantageous if the tool receptacle 18 is shaped in line with the contour 45 of a tool head 46.

A particularly advantageous hand mixer 2 comprises a housing 5 with a motor 47 and an accumulator battery 6 located in it and provides that the motor 47 and the accumulator battery 6 are fastened to a carrier 48 which can be placed in and fastened to the housing 5. In an advantageous configuration it is provided that the carrier 48 is connected with the housing 5 without using any adhesive and/or screws. In an advantageous configuration it is provided that the carrier 48 exhibits engagement elements 49, 74 with which it is fixed, in particular clipped, onto corresponding counter elements 50 on the housing 5. In an advantageous configuration it is provided that an electronic control unit 51 is fastened onto the carrier 48, and in particular is clipped on by means of first engagement elements 52. In an advantageous configuration it is provided that electrical switches 67, 69, in particular an on/off switch 67, are fastened onto the carrier 48, preferably clipped on by means of second engagement elements 53. In an advantageous configuration it is provided that the motor 47 and/or the accumulator battery 6 is clipped onto the carrier 48. In an advantageous configuration it is provided that the carrier 48 is made of plastic, in particular by injection molding. In an advantageous configuration it is provided that the carrier 48 is held in the housing 5 by means of supports 54, in particular supporting ribs. In an advantageous configuration it is provided that the housing 5 exhibits two assemblable housing shells 56, 57 which in particular can be connected to each other gaplessly by means of a housing groove 58 and housing tongue 59. In an advantageous configuration it is provided that the carrier 48 is made of plastic, in particular by injection molding.

A particularly advantageous carrier 48 is suitable and intended for the advantageous hand mixer 2.

A particularly advantageous method for producing a hand mixer 2 with a housing, a motor 47 located in it and an accumulator battery 6 located in it comprises the following process steps: preassembly of the motor 47 and the accumulator battery 6 on a carrier 48; insertion of the carrier 48 with motor 47 and accumulator battery 6 in the housing 5; closure of the housing 5. In an advantageous configuration it is provided that the motor 47 and the accumulator battery 6 can be clipped onto the carrier 48. In an advantageous configuration it is provided that the carrier 48 can be clipped onto the housing 5.

A particularly advantageous handheld kitchen appliance 1, in particular hand mixer 2, with a housing 5 comprises at least a first 56 and a second 57 housing shell and a fastener 60 for connecting the two housing shells 56, 57 to each other, and provides that the fastener 60 exhibits a clamping element 61 which engages on the first housing shell 56 at at least two separate fastening points 62 and presses the first housing shell 56 against the second housing shell 57 at the two fastening points 62. In an advantageous configuration it is provided that the clamping element 61 is formed by a clamping cover 63 which is in particular separate from the housing shells 56, 57 and which is connected gaplessly with the two housing shells 56, 57 along a second connection line 65. In an advantageous configuration it is provided that the clamping cover 63 clamps the two housing shells 56, 57 together. In an advantageous configuration it is provided that the clamping element 61 exhibits at least a first 79, a second 80 and a third 81 connection element and the clamping element 61 is fastened with the first 79 and second 80 connection element on the first housing shell 56 and with the third connection element 81 on the second housing shell 57. In a special further configuration it is provided that the first 79 and second 80 connection element is formed by a connection protrusion 82 which engages in a connection support 83 on the respective housing shell 56, 57. In an advantageous configuration it is provided that the third connection element 82 establishes a screw connection 85. In an advantageous configuration it is provided that a fourth connection element 84 is provided on the clamping element 61 with which the clamping element 61 is fastened to the first 56 or the second 57 housing shell. In an advantageous configuration it is provided that the two housing shells 56, 57 can be connected to each other by means of a housing groove and housing tongue on a first connection line 64 formed along their edges 66. In an advantageous configuration it is provided that the housing shells 56, 57 exhibit clip elements with which the housing shells 56, 57 can be connected with each other. In an advantageous configuration it is provided that the kitchen appliance 1 is powered by an electric motor and is in particular a hand mixer 2. In an advantageous configuration it is provided that the housing shells 56, 57 are designed essentially as half-shells. In an advantageous configuration it is provided that the two fastening points 62 are located at least 2 cm, in particular at least 3 cm, preferably at least 4 cm from each other.

A particularly advantageous method for producing a kitchen appliance 1, in particular hand mixer 2, which exhibits a first 56 and a second 57 housing shell and a clamping cover 63 so that the housing shells 56, 57 and the clamping cover 63 form an essentially closed housing 5 provides for the following process steps: The two housing shells 56, 57 are placed together along a first connection line 64 formed by the edges 66 of the housing shells 56, 57; the clamping cover 63 is attached at at least two separate fastening points 62 on the first housing shell 56; the two housing shells 56, 57 are pressed together by means of the clamping cover 63 in such a way that the first housing shell 56 is pressed against the second housing shell 57 at the two fastening points 62.

A particularly advantageous electric-motor kitchen appliance 1, in particular an electric-motor handheld appliance, preferably a hand mixer 2, with an on/off switch 67, incorporates a finger-actuatable electric control 68 for the on/off switch 67. Finger-actuatable means that the control is suitable and intended for being unlocked manually by one finger. In an advantageous configuration it is provided that the control 68 exhibits a safety switch 69 which is separate from the on/off switch 67. In an advantageous configuration it is provided that an actuation-effective distance D between the on/off switch 67 and the safety switch 69 amounts to at least 0.5 cm, in particular at least 0.8 cm, preferably at least 1.2 cm, and in particular amounts to less than 4 cm, in particular less than 3 cm, preferably less than 2.5 cm. In an advantageous configuration it is provided that the control 68 exhibits a time-integration circuit 70 with which the on/off switch 67 is unlocked with a time delay after actuation of the safety switch 69. In an advantageous configuration it is provided that the time delay of the time-integration circuit 70 has a duration of a least 0.1 s, in particular at least 0.2 s, preferably at least 0.3 s. In an advantageous configuration it is provided that the control 68 exhibits a time-integration circuit 70 with which the on/off switch 67 is released with a time delay after actuation of the safety switch 69 for a preset time window. In an advantageous configuration it is provided that the length of the time window is in a range from 0.3 s to 2 s, in particular in a range from 0.5 to 1 s. In an advantageous configuration it is provided that a further electric actuating element 71, in particular an electric step switch, is provided for setting an electrical power stage of the kitchen appliance 1, whereby the actuating element 71 is provided in particular on, in particular together and in connection with the on/off switch 67. In an advantageous configuration it is provided that the safety switch 69 only remains switched on while it is being actuated, in particular pressed, and otherwise switches off.

A particularly advantageous method of switching on/off a kitchen appliance 1, in particular an electric-motor handheld appliance, preferably hand mixer 2, which exhibits an on/off switch 67 and a separate safety switch 69, whereby the on/off switch 67 is unlocked when a safety switch 69 is actuated, provides that the safety switch 69 switches electronically. In an advantageous configuration it is provided that the on/off switch 67 is unlocked when the on/off switch 67 is actuated after actuation of the safety switch 69, in particular after a time delay lasting at least 0.1 s, in particular at least 0.2 s, preferably at least 0.3 s. In an advantageous configuration it is provided that the unlocking is only effective for the length of a preset time window in a range from 0.3 s to 2 s, in particular in a range from 1.5 s to 1 s. In an advantageous configuration it is provided that the on/off switch 67 can only be unlocked while the safety switch 69 is being held. In an advantageous configuration it is provided that after being unlocked the on/off switch 67 also remains switched on when the safety switch 69 is no longer held.

The invention relates to an electric-motor appliance 1, in particular an electric-motor handheld appliance, preferably hand mixer 2, with an on/off switch 67 and incorporates an electric control 68 for the on/off switch 67, as well as to a process for switching a kitchen appliance 1 on/off, whereby the on/off switch 67 is unlocked when a safety switch 69 is actuated by one finger of a user, which safety switch 69 switches electronically. The invention is characterized in that manual actuation of two separate switches reduces the probability of unintentionally operating the electric-motor kitchen appliance 1, which considerably increases the safety of the electric-motor kitchen appliance 1 in the household.

LIST OF REFERENCE NUMBERS

1 Kitchen appliance
2 Hand mixer
3 Charging system
4 Holder
5 Housing
6 Accumulator battery
7 Safety device
8 Charger
9 Coupling
10 First sliding contact
11 Second sliding contact
12 Angle of turn
13 First slider
14 Second slider
15 First sliding ring
16 Second sliding ring
17 Tool
18 Tool receptacle
19 Opening
20 Longitudinal axis
21 Fastening legs
22 Spring elements
23 Stand surface
24 Fastening surface
25 Temperature sensor
26 Control device
27 Charge status display
28 LED display
29 Enclosure
30 Wall
31 Surface
32 Electrical leads
33 Contact surfaces
34 Receptacle base
35 Corrugations
36 Radial gap
37 Mounting plate
38 Mounting plate groove
39 Mounting plate tongue
40 Arrangement
41 First long hole
42 Second long hole
43 Screw
44 Rubber feet
45 Contour
46 Tool head
47 Motor
48 Carrier
49 Engagement elements
50 Counter elements
51 Electronic control unit
52 First engagement element
53 Second engagement element
54 Supports
55 Screw fastener
56 First housing shell
57 Second housing shell
58 Housing groove
59 Housing tongue
60 Fastener
61 Clamping element
62 Fastening points
63 Clamping cover
64 First connection line
65 Second connection line
66 Edges
67 On/off switch
68 Electric control
69 Safety switch
70 Time-integration circuit
71 Actuating element
72 Bayonet connection
73 Optical fiber
74 Engagement element
75 Rotor
76 Shaft
77 Contact leg
78 Board
79 First connection element
80 Second connection element
81 Third connection element
82 Connection protrusion
83 Connection support
84 Fourth connection element
85 Screw connection
86 Cover support
87 Guide surface
88 Coupling direction
89 Rubber membrane
D Actuation-effective distance
R1 Radius of the first sliding ring 15
R2 Radius of the second sliding ring 16

The invention claimed is:

1. An electric-motor handheld kitchen appliance, comprising:
at least one exposed and unguarded rotating blade or cutter;
a finger-actuatable on/off switch to cause rotation of the blade or cutter; and
a finger-actuatable electric control for the on/off switch,
wherein the on/off switch and the control are located proximate to one another, wherein activation of the on/off switch is enabled while the control is switched on, and wherein the control only remains switched on while it is pressed, and wherein the on/off switch is configured to remain switched on after activation even when the control is not pressed.

2. The appliance of claim 1, further comprising a mixer.

3. The appliance of claim 1, wherein the control includes a safety switch which is separate from the on/off switch and which is in a recess.

4. The appliance of claim 3, wherein an actuation-effective distance between the on/off switch and the safety switch is at least 0.5 cm.

5. The appliance of claim 3, wherein an actuation-effective distance between the on/off switch and the safety switch is at least 0.8 cm 6. The appliance of claim 3, wherein an actuation-effective distance between the on/off switch and the safety switch is at least 1.2 cm 7. The appliance of claim 3, wherein an actuation-effective distance between the on/off switch and the safety switch is less than 4 cm.

8. The appliance of claim 3, wherein an actuation-effective distance between the on/off switch and the safety switch is less than 3 cm.

9. The appliance of claim 3, wherein an actuation-effective distance between the on/off switch and the safety switch is less than 2.5 cm.

10. The appliance of claim 1, further including an electric step switch that sets an electric power stage of the kitchen appliance.

11. The appliance of claim 1, wherein the on/off switch and the electric control are positioned within a common recess.

12. The appliance of claim 1, wherein the on/off switch is only operable after the control has been actuated at least a predetermined amount of time.

13. The appliance of claim 12, wherein the predetermined amount of time is 0.1 to less than 1.0 seconds.

14. The appliance of claim 13, wherein the predetermined amount of time is 0.1 to 0.5 seconds.

15. The appliance of claim 1, wherein the on/off switch and the control are spaced an actuation-effective distance from one another so as to be operable by two fingers of the same hand of an operator.

16. The appliance of claim 15, wherein the distance is such that the on/off switch and the control cannot be actuated at the same time by a single finger.

17. An electric-motor handheld kitchen appliance, comprising:
at least one exposed and unguarded rotating blade or cutter;
an on/off switch to cause rotation of the blade or cutter; and
a finger-actuatable electric control for the on/off switch,
wherein the control includes a safety switch and a time-integration circuit to unlock the on/off switch only after a predetermined time delay during which the safety switch is actuated; and
wherein the time-integration circuit unlocks the on/off switch for a preset time window after the predetermined time delay.

18. The appliance of claim 17, wherein the time delay of the time-integration circuit has a duration of at least 0.1 seconds.

19. The appliance of claim 17, wherein the time delay of the time-integration circuit has a duration of at least 0.2 seconds.

20. The appliance of claim 17, wherein the time delay of the time-integration circuit has a duration of at least 0.3 seconds.

21. The appliance of claim 17, wherein the duration of the time window is about 0.3 seconds to about 2 seconds.

22. The appliance of claim 17, wherein the duration of the time window is about 0.5 seconds to about one second.

23. The appliance of claim 17, wherein the preset time window is from about 0.3 to 2.0 seconds.

24. A method for switching on/off a hand mixer having a safety switch located proximate to an on/off switch, and at least one unguarded and exposed rotating blade or cutter, the method comprising activating the safety switch to enable operation of the on/off switch; and activating the on/off switch to cause rotation of the blade or cutter, wherein the operation of the on/off switch is enabled only within a preset time window following activation of the safety switch, and wherein the operation of the on/off switch is only enabled after the safety switch is activated for at least 0.1 seconds.

25. The method of claim 24, wherein the preset time window is from about 0.3 to 2.0 seconds.

\* \* \* \* \*